United States Patent [19]

Poirier

[11] Patent Number: 4,996,776
[45] Date of Patent: Mar. 5, 1991

[54] METHOD AND DEVICE FOR DETERMINING THE HEADING WITH WIND (OR WITH CURRENT) OF AN AIR (OR SEA-GOING) VEHICLE

[76] Inventor: Alain Poirier, 16, Boulevard Flandrin, 75116 Paris, France

[21] Appl. No.: 316,839

[22] Filed: Feb. 28, 1989

[30] Foreign Application Priority Data

Mar. 1, 1988 [FR] France .................. 88 02528

[51] Int. Cl.$^5$ ............................. G01C 21/20
[52] U.S. Cl. .................. 33/15 D; 235/78 N
[58] Field of Search ............. 33/1 B, 15 B, 1 SD; 235/61 NV, 88 N, 78 N

[56] References Cited

U.S. PATENT DOCUMENTS

| | | | |
|---|---|---|---|
| 2,019,708 | 11/1935 | Jones ............................ | 33/457 X |
| 3,150,824 | 9/1964 | Copenhayer ................... | 235/78 N |
| 3,255,961 | 6/1966 | Cumberpatch ................. | 235/78 N |
| 3,282,501 | 11/1966 | Copeland ....................... | 235/88 N X |
| 3,630,435 | 12/1971 | Titus .............................. | 235/61 NV |
| 3,812,586 | 5/1974 | Itokawa ......................... | 33/1 SD |
| 3,835,299 | 9/1974 | Turney .......................... | 235/78 N X |
| 3,844,041 | 10/1974 | Wilson, Jr. .................... | 33/1 SD |
| 4,138,817 | 2/1979 | Frost et al. .................... | 33/1 SD |
| 4,359,628 | 11/1982 | Lambert ........................ | 235/61 NV |
| 4,499,665 | 2/1985 | Davis ............................. | 33/1 B |

*Primary Examiner*—Daniel M. Yasich
*Attorney, Agent, or Firm*—William A. Drucker

[57] ABSTRACT

The invention provides a method and device for determining the heading with wind (or with current) of an air (or sea-going) vehicle. The device of the invention comprises a support element with two coaxial compass cards, one of which is assigned to the heading without wind and the other serves as indication of the heading with wind, as well as a plurality of rings which may be mounted for rotation coaxially with said compass cards and in the coronal space therebetween. Each of the rings corresponds to a particular situation of the aircraft determined by a wind speed/aircraft speed ratio and has a pointer intended to be oriented along the wind bearing. A series of lines ensures the correspondence between the compass cards.

12 Claims, 1 Drawing Sheet

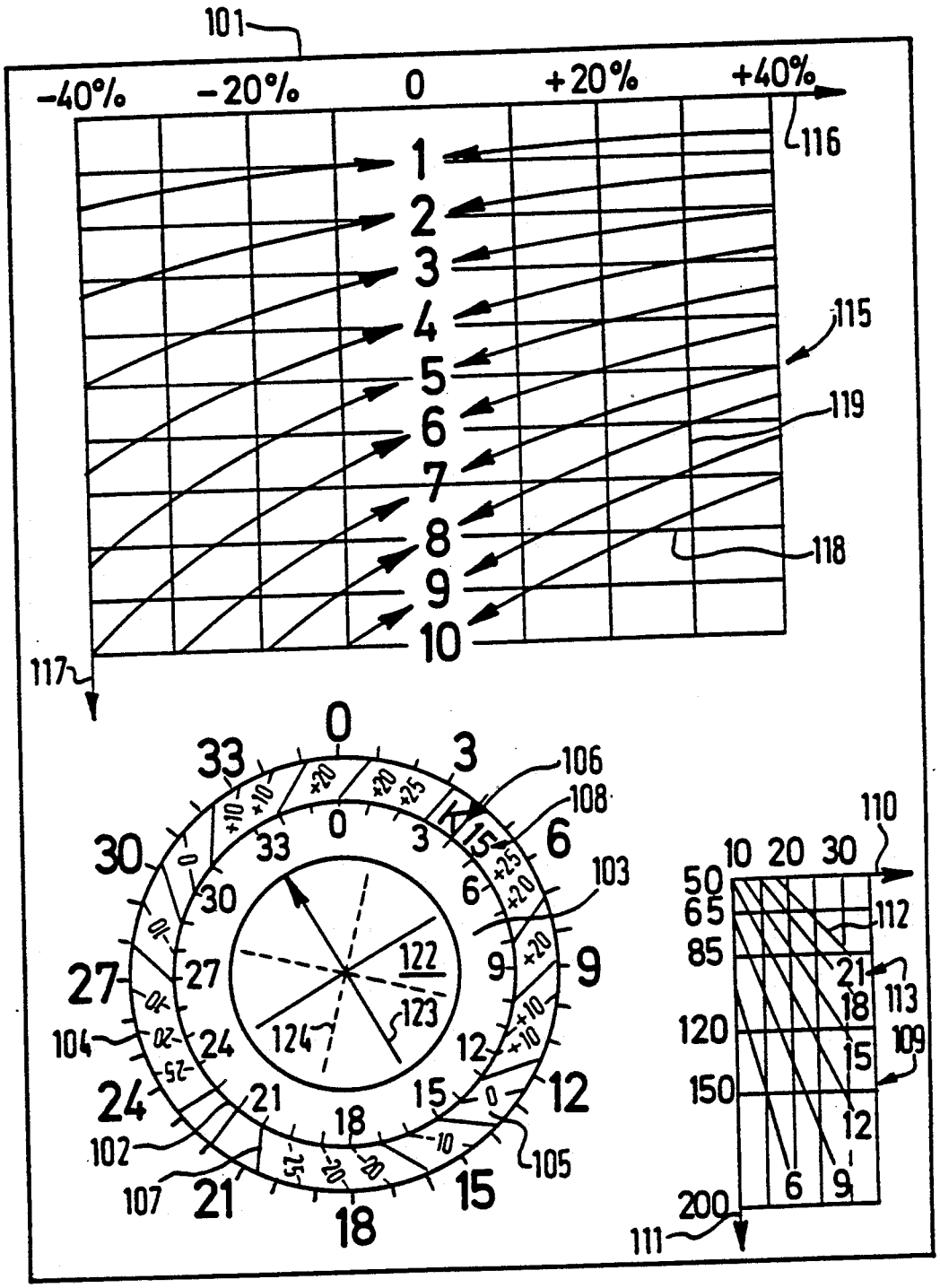

METHOD AND DEVICE FOR DETERMINING THE HEADING WITH WIND (OR WITH CURRENT) OF AN AIR (OR SEA-GOING) VEHICLE

BACKGROUND OF THE INVENTION

The present invention relates to a method and device for determining the heading with wind (or with current) of an air (or sea-going) vehicle, from the heading without wind, usually called "course", and from a corrective value representative of the ratio between the wind (or current) speed and the vehicle speed.

Subsidiarly the invention proposes means for further determining an estimated time, with wind (or with current), which the vehicle will take to travel a distance between two geographical points, from an estimated time without wind (or without current).

First of all, it should be recalled that the heading without wind (or without current) is the heading which the vehicle would follow in the absence of wind (or current). To be able to cover the same route in the presence of wind (or current), the vehicle must make a drift correction and follow a fictitious heading called heading with wind (or with current). The estimated time without wind (or without current), once corrected as a function of the wind (or of the current), gives the estimated time with wind (or with current).

Traditionally, the heading and the time with wind (or with current) is determined either by means of a mental calculation, or a geometrical construction, or the use of an abacus or pocket calculator. It has proved however that these methods, which must often be applied by the pilot during piloting, are particularly inconvenient. They result in a work load, rely usually on manipulations and comprise risks of error.

The purpose of the invention is more particularly to reduce these drawbacks by simplifying said determinations to a maximum.

It is based on the discovery that drift and estimated time corrections are made by vectorial compositions in which the angles do not depend on the absolute value of the vectorial magnitudes but on their relative value, each magnitude being divided by the speed of the vehicle (speed with respect to the air or with respect to the current).

This property brings out the ratio between the wind (or current) speed and the vehicle speed, which ratio makes it possible to define a situation of the vehicle to which a given drift correction corresponds, for each relative position of the vehicle and of the wind (or of the current).

From the value of this ratio, the situation of the vehicle may be determined using a correspondence table or even an abacus having as coordinates the successive values of the vehicle speed and of the wind (or of the current) speed and a series of curves each indicating a preestablished situation of the vehicle.

Because the speed of the wind (or of the current) can be known from meteorological information or sea charts, and the vehicle speed is known, this determination may be made just before the flight (or the sea journey) or during the flight (or the sea journey).

Once the choice of the situation has been determined, the drift correction depends on the relative position of the heading without wind (or without current) of the vehicle and of the direction of the wind (or of the current), and only on that: a drift correction and only one corresponds to a relative position.

The Applicant has demonstrated that it was possible, to avoid calculating the heading with wind (or with current), by adding to the heading without wind (or without current) the drift correction, to use a correspondence system associating with a heading without wind (or without current) a heading with wind (or with current), without explaining the correction.

SUMMARY OF THE INVENTION

The method of the invention is based on these facts and therefore comprises the following operating phases:

determination of a situation of the vehicle corresponding to the value of the wind (or of the current) speed/vehicle speed ratio by means of a first preestablished correspondence table; and the geometrical construction of the vectorial sum between a first unitary vector oriented along the heading without wind (or without current) and a second vector defined, in modulus and in direction, by means of a second correspondence table, as a function of said situation and of the bearing of the wind (or of the current), the vector resulting from this vectorial sum then indicating the heading with wind (or with current) of the vehicle.

Advantageously, said second correspondence table will further give a magnitude representative of a correction, e.g. in percentage, of the time which the vehicle will take to make its journey.

For implementing the above defined method, the invention provides a device comprising a support element with two coaxial compass cards, one of which is assigned to the heading without wind (or without current) and the other serves as indication of the heading with wind (or with current), as well as a plurality of rings which can be mounted for rotation coaxially with said compass cards and in the coronal space therebetween, each of these rings corresponding to a particular situation of the vehicle, determined by a wind (or current) speed/vehicle speed ratio and having a pointer intended to be oriented along the wind (or current) bearing, as well as a series of lines made so as to ensure correspondence between the compass card corresponding to the heading without wind (or without current) and the compass card corresponding to the heading with wind (or with current).

Furthermore, to each of said lines may be assigned a value, e.g. in percentage, representative of the time correction to be made.

It is clear that with this device, once the ring has been determined and mounted on the support, with the pointer correctly oriented along the bearing of the wind (operations which may be carried out just before departure), no further operation or manipulation is required, the operator being able to read directly, opposite the heading without wind (or without current), the heading with wind (or with current) and the estimated time correction, whatever the heading without wind.

BRIEF DESCRIPTION OF THE DRAWINGS

One embodiment of this device will be described hereafter, by way of non limitative example, with reference to the accompanying drawings in which:

The single FIGURE is a front view of a device of the invention further including an abacus for determining the wind speed/aerodyne speed ratio and an abacus for determining the estimated time with wind.

DESCRIPTION OF THE PREFERRED EMBODIMENT

Such as shown in this drawing, the device comprises first of all a flat support 101 such for example as a sheet of transparent plastic material of rectangular shape, whose upper face is dulled so as to be able to write on it with a pencil and rub out with a rubber.

On this support are drawn two coaxial circles of different diameters, associated with two respective compass cards, namely:

a first circle 102 defining a disk 103 graduated from 0 to 33 (0° to 360°) in accordance with a first compass card assigned to the heading without wind, and a second circle 104, of larger diameter, graduated from 0 to 33 (0° to 360°) in accordance with a second compass card intended for reading the heading with wind.

Between these two circles is rotatably mounted a coaxial ring 105 of small thickness, which comprises, on the one hand, a mark 106 for orienting it in accordance with the bearing of the wind and, on the other hand, a series of lines 107 for establishing a relationship between the two compass cards. To each of these lines 107 are further assigned indications for correction of the estimated time, to which a sign is added. These indications are expressed in percentage and/or seconds lost or gained per minute.

Ring 105 forms part of a set of rings which may be removably mounted on support 101, each of these rings corresponding to a given ratio between the wind speed and that of the aerodyne, and being identified by a guide number 108 defined by the product of the basic factor (time in minutes to cover a nautical mile) multiplied by the wind speed expressed in knots.

Advantageously, these rings 105 may be stacked about the disk and may be held on support 101 by a device (not shown) designed so as to be able to remove them or fix them while allowing them to rotate and to be held in the chosen position.

In this example, on support 101, is also drawn an abacus 109 showing as abscissa 110 the wind speed in knots and as ordinates 111 the speed of the aircraft in usual units (e.g. in knots or in km/h); a series of marks 112 joining together the points corresponding to the same ratio (wind speed/aircraft speed) expresses the guide number 113 which will serve for designating the ring 105 to be used (in this example, the ring used carries the guide number 15).

A second abacus 115 also drawn on support 101 shows as abscissa 116 the correction percentages (8) (which correspond to those indicated on ring 105) and as ordinates 117 the estimated flight times; lines 118 join together the points corresponding to the same flight time.

By means of the above mentioned device, the heading with wind can be determined by effecting the followign operating steps which obviously result from the above mentioned structure:

(i) selecting a ring 105 corresponding to the ratio wind speed/true air speed and mounting said ring for rotation between the compass cards (circles 102 and 104);

(ii) orienting this selected ring 105 according to the wind direction by putting the mark 106 in front of the graduation of the second compass card (circle 104) which corresponds to this direction;

(iii) selecting the graduation of the first compass card (circle 102) which corresponds to the heading without wind and the line 107 (or an interpolated line) having a first end in front of this selected graduation;

(iv) reading the heading with wind which is indicated on the second compass card (circle 104) by the second end of the selected line 107 (in fact this heading with wind is indicated by the vector resulting of the sun of a first unitary vector extending from the center of the compass cards to the first compass graduation (circle 102) and a second vector which consists of a line 107).

The estimated flight time with wind is then read using the following procedure:

the line 118 corresponding to the estimated flight time without wind is determined by means of the graduation shown as ordinates 117;

the intersection of this line with the correction percentage line 119 (scale shown as abscissa) is determined which corresponds to the percentage read from ring 105;

from the graduation shown as ordinates, the value is read which is situated at the same level as said intersection, this value being representative of the estimated time with wind.

The above described device may further comprise, as shown, a small disk 122 mounted for rotation on support 101 coaxially with ring 105, and carrying a first system of rectangular coordinates 123 one of the axes of which is provided with a reference mark and a second system of coordinates 124, shown with broken lines, whose two axes extend respectively along the bisectors of the first reference mark 123. This disk 122, which is mounted on support 101 with a tight fit, is more particularly intended to facilitate approach procedures.

The invention is not limited to the above described embodiment.

Thus, in a variant, this device could comprise means for reading the heading with wind, in accordance with two speeds of the vehicle, e.g. a cruising speed and an approach speed.

These means could comprise, on the same support, two independent double compass card systems, accommodating the same set of rings, each ring corresponding to a single guide number.

Advantageously, each ring may comprise, on each of its faces, reference marks for determining the heading with wind. On one of these faces, the time corrections may be expressed as a correction percentage and will then be intended for cruising speeds and, on the other face, these corrections will be expressed in time (or seconds) lost or gained per minute, these corrections being intended for approach speeds.

It is clear that, such as described above, the device of the invention offers, for a relatively moderate cost, an appreciable aid to air navigation (aircraft, helicopters, ultra light motorized aircraft).

Of course, with a simple adaptation obvious to a man skilled in the art, this device may be used for determining the heading with current of a sea-going vehicle), the notion of wind then being replaced by the notion of current).

What is claimed is:

1. Device for determining the heading with wind of an air vehicle, from the heading without wind (course) and from a corrective value representative of a ratio between an wind speed and a vehicle speed, said device comprising:
(i) a support element on which are drawn first and second concentric compass cards of different diameters, the first compass card having a first set of graduations each indicating a value of heading without wind, and the second compass card having a second set of graduations each indicating a value of heading with wind;
(ii) a plurality of rings each corresponding to a range of values of said ration;
(iii) means for selectively mounting said rings for rotation between said compass cards, coaxially therewith, said rings each having a pointer intended to be oriented so as to indicate a wind direction on one of said compass card, as well as a series of lines drawn so as to ensure correspondance between said first and said second compass card.

2. The device as claimed in claim 1, wherein said rings bear indications of correction percentages relative to time corrections to be made to the time which the vehicle would take to make its journey in the absence of current, these indications being associated with at least a part of said lines.

3. The device as claimed in claim 1, wherein said support further comprises a first abacus having a scale of current speeds, a scale of vehicle speeds, and, in correspondence with these two scales, a series of marks indicating a guide number representative of a current speed/vehicle speed ratio.

4. The device as claimed in claim 1, wherein said support further comprises a second abacus having a first set of graduations representative of said correction percentages, a second set of graduations representative of estimated navigation times without current and a plurality of lines each indicating a navigation time with current in correspondance with said graduations.

5. The device as claimed in claim 1, wherein said rings bear indication of correction percentages relative to time corrections to be made to the time which the vehicle would take to make its journey in the absence of wind, these indications being associated with at least a part of said lines.

6. The device as claimed in claim 9, further comprising means for stacking said rings coaxially to said compass cards and holding them on said support, so as to be able to remove them or fix them while making it possible for them to rotate and to be held in the chosen position.

7. The device as claimed in claim 1, wherein said support further comprises a first abacus having a scale of wind speeds, a scale of aircraft speeds, and, in correspondence with these two scales, a series of marks indicating a guide number representative of a wind speed/aircraft speed ratio.

8. The device as claimed in claim 1, wherein said support further comprises a second abacus having a first set of graduations representative of said correction percentages, a second set of graduations representative of estimated flight times without wind and a plurality of lines each indicating a flight time with wind in correspondance with said graduations.

9. Device for determining the heading with current of a sea-going vehicle, from the heading without current (course) and from a corrective value representative of a ratio between a current speed and a vehicle speed, said device comprising:
(i) a support element on which are drawn first and second concentric compass cards of different diameters, the first compass card having a first set of graduations each indicating a value of heading without current, and the second compass card having a second set of graduations each indicating a value of heading with current;
(ii) a plurality of rings each corresponding to a range of values of said ratio;
(iii) means for selectively mounting said rings for rotation between said compass cars, coaxially therewith, said rings each having a pointer intended to be oriented so as to indicate a current direction on one of said compass card, as well as a series of lines drawn so as to ensure correspondance between said first and said second compass card.

10. The device as claimed in claim 9, further comprising means for stacking said rings coaxially to said compass cards and holding them on said support, so as to be able to remove them or fix them while making it possible for them to rotate and to be held in the chosen position.

11. The device as claimed in claim 9, wherein a guide number is assigned to each of said rings which consists of the product of a basic factor (time in minutes to cover a nautica mile) multiplied by the current speed expressed in knots.

12. The device as claimed in claim 1, wherein a guide number is assigned to each of said rings which consists of the product of a basic factor (time in minutes to cover a nautical mile) multiplied by the wind speed expressed in knots.

* * * * *